United States Patent [19]
Low et al.

[11] 3,745,352
[45] July 10, 1973

[54] RADIATION SENSITIVE SOLID STATE SWITCH

[76] Inventors: George M. Low, Deputy Administrator of the National Aeronautics and Space Administration with respect to an invention of; Robert J. Hutto, Kent, Wash.

[22] Filed: Oct. 21, 1970

[21] Appl. No.: 82,649

[52] U.S. Cl. .............. 250/237 R, 250/239, 250/229
[51] Int. Cl. .............................................. H01j 3/14
[58] Field of Search .................... 250/219 I, 231 SE, 250/239, 233, 208, 209, 219 DD, 231 R, 237 R, 229; 315/155

[56] References Cited

UNITED STATES PATENTS

| | | | |
|---|---|---|---|
| 3,194,967 | 7/1965 | Mash | 250/211 K |
| 3,286,096 | 11/1966 | Finlay | 250/208 |
| 3,459,943 | 8/1969 | Harnden, Jr. | 250/233 X |
| 2,268,133 | 12/1941 | Carlson | 250/219 DD |
| 3,234,394 | 2/1966 | Worden | 250/231 SE |
| 3,198,966 | 8/1965 | Roberts | 250/219 DD |

*Primary Examiner*—Walter Stolwein
*Attorney*—John R. Manning, J. H. Warden and Paul F. McCaul

[57] ABSTRACT

A mechanically operable solid state switch particularly suited for use in achieving a variable circuit-switching function in an environment wherein "bounce" and "arcing" between switch contacts are to be avoided, characterized by an annular array of photo-responsive switching devices, disposed in communication with an included source of radiation, and a plurality of interchangeable, mechanically operable interrupter disks, each having a predetermined pattern of transparent and opaque portions and adapted to be interposed in a masking relationship between the source of radiation and the array of photo-responsive devices, whereby an operative displacement of each disk serves to MAKE and BREAK selected electrical circuits through the photo-responsive devices of said array in sequences dictated by said pattern of the opaque and transparent portions of the interrupter.

8 Claims, 7 Drawing Figures

Patented July 10, 1973 3,745,352

ROBERT J. HUTTO
INVENTOR

Paul F. McCaul
J. H. Warden
ATTORNEYS

RADIATION SENSITIVE SOLID STATE SWITCH

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The invention relates to electrical switching circuits and more particularly to a mechanically operable solid state switch adapted to achieve a variable circuit-switching function in environments wherein it is preferred that normally attending bounce and arcing between switch contacts be precluded as a switching function is imposed on the switch.

2. Description of the Prior Art

The prior art includes numerous mechanically operable switching devices which are manually manipulated for purposes of controlling the function of associated electrical circuits. Normally, such devices include a pair of electrical contacts which must be mutually displaced in a manner such that the contacts are brought into a physical engagement for completing an electrical circuit through an associated circuit, and displaced into a mutually spaced relationship in order that associated electrical circuits are broken. Frequently, a bouncing and an arcing between the electrical contacts are experienced as this displacement is achieved. Bounce initiates erratic circuit operation while arcing tends to be hazardous and cannot be tolerated where a switch is employed in volatile environments. Further, bounce and arcing have a deleterious effect on switch contacts.

In order to avoid hazards established by arcing occurring between mutually displaceable switch contacts, attempts have been made to confine the contacts within a sealed chamber for purposes of isolating the contacts from the switch's environment.

A technique often employed in fabricating switches for use in environments wherein contact bounce and arcing must be avoided includes liquid metal switches which utilize liquid metals flowing between spaced electrodes in a manner such that as the liquid metal simultaneously engages the electrodes an electrical circuit is made or established through a body of metal between the electrodes.

Heretofore, solid state switching of circuits has been achieved through the use of switching circuits. Such circuits are activated through a use of complex arrays of solid state devices which respond only to gating signals and therefore fail to satisfy a need for mechanically activated devices.

Furthermore, numerous switching circuits currently are available which are operable for achieving a predetermined sequence of operation of electrically driven devices. Normally, such switches include a plurality of reeds in a driven drum having radially extended protrusions for purposes of engaging and deflecting the reeds at predetermined positions for said drum. Here, again, such devices frequently experience contact bounce and arcing and often are not deemed to be totally satisfactory for use in environments wherein such must be avoided.

While the various types of switches currently available serve quite satisfactorily for their intended purpose, it readily is apparent that while existing devices are employed in achieving sequence switching thus requiring repetitive making and breaking of circuits at suitable contacts, existing devices fail fully to satisfy current needs for a simplified, mechanically operable switch which is capable of achieving sequence switching without attendant bounce and arcing.

OBJECTS AND SUMMARY OF THE INVENTION

Therefore, it is an object of the instant invention to provide an improved, simplified circuit switching device for achieving circuit switching operations without experiencing contact bounce and arcing.

It is another object to provide an improved switching device for an electrical circuit which employs no relatively movable electrical contacts.

Another object is to provide a mechanically operative solid state switching device which mechanically is operable for purposes of reversing an imposed state of conductivity on an associated electrical circuit.

It is another object of the instant invention to provide an improved solid state electrical switch having no moving electrical contacts adapted to be manually manipulated for purposes of reversing the conductive state of a plurality of electrical circuits in a predetermined sequence.

Another object is to provide an improved electrical switch which includes a plurality of switching components adapted to be interchanged for establishing preselected and variable switching sequences for a multiplicity of sequentially energized circuits.

These and other objects and advantages are achieved through a mechanically operative, solid state switch which includes therein an annular array of a plurality of photo-sensitive devices disposed in operative communication with an energized source of light and a plurality of interchangeable light interrupters each being formed as a rotatable disk having a predetermined pattern of related opaque and transparent portions so disposed and arranged relative to a source of light and the array of photo-sensitive devices that mechanical displacement of the opaque and transparent portions of the disk, relative to the photo-sensitive devices, serve to MAKE and BREAK electrical circuits in predetermined sequences as the masking and unmasking of the various photo-sensitive devices of the array are achieved in predetermined sequences.

DESCRIPTION OF THE PREFERRED EMBODIMENT

Figures 1, 2, 3, 4, 5, 6, 7:
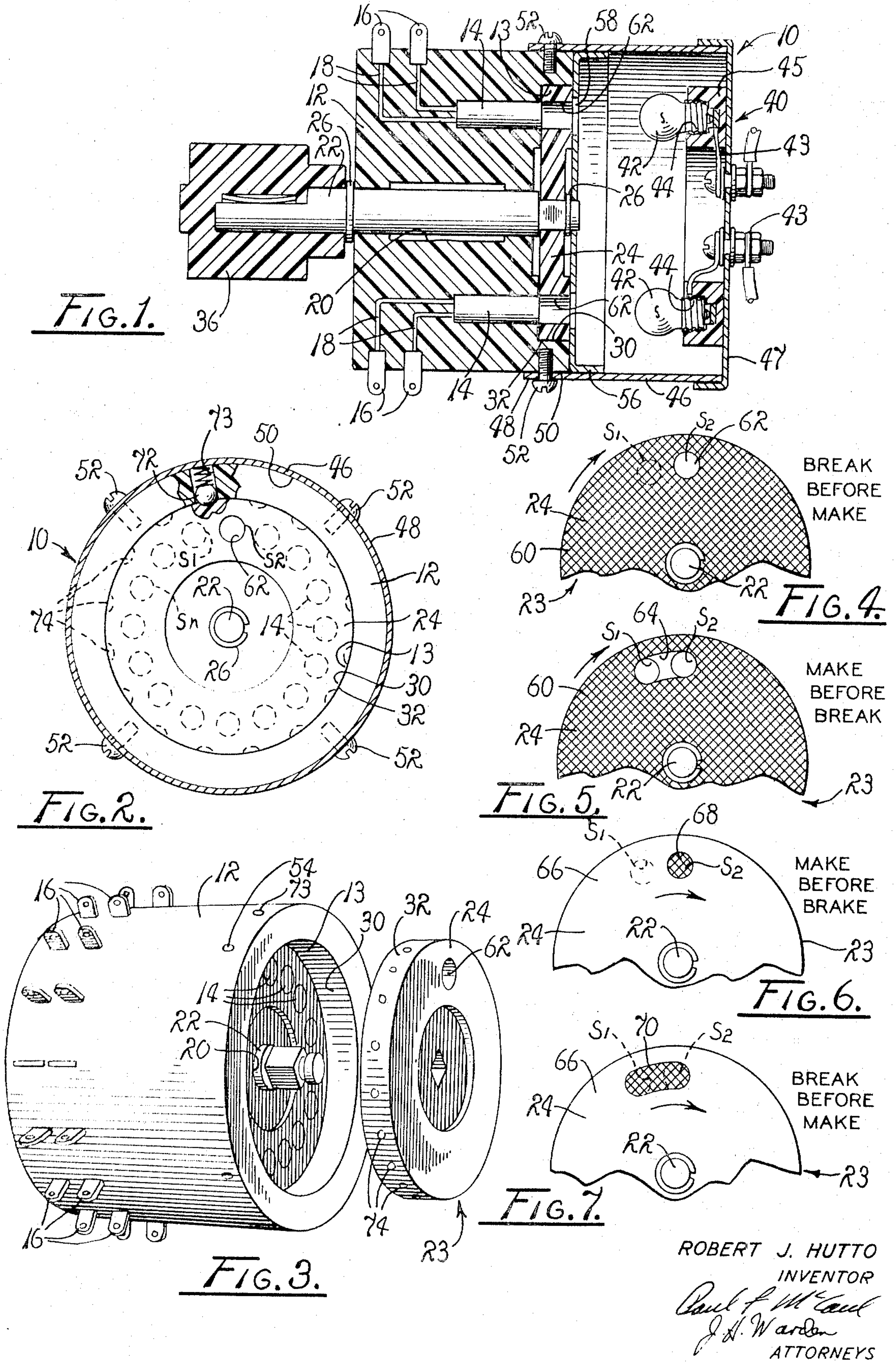
FIG. 1 is a cross-sectional view of a mechanically operable, solid state switch which embodies the principles of the instant invention.
FIG. 2 is an end view of the switch of FIG. 1, illustrating an annular array of photo-sensitive devices employed by the switch of FIG. 1.
FIG. 3 is a partial perspective, partially exploded view of the switch shown in FIGS. 1 and 2.
FIGS. 4 through 7 are fragmentary end views of a plurality of mechanically operable interchangeable interrupters, each having both transparent and opaque portions arranged in mutually exclusive patterns for imposing on the switch of FIGS. 1 through 3 differing switching functions.

Referring now to the drawing wherein like reference characters designate like or corresponding parts throughout the several views, there is illustrated in FIG. 1 a switch 10 which embodies the principles of the present invention.

The switch 10 includes a body 12 of a generally cylindrical configuration formed of any suitable opaque material, such as, for example, a synthetic resin. While the technique utilized in fabricating the body 12 is dictated by the material employed, preferably, the body is fabricated by molding a suitable thermosetting synthetic resin within a mold of a given size and shape, cooling and subsequently drilling and machining the resulting billet employing any convenient technique. Since the body 12 can be fabricated in any suitable manner, and the technique of fabrication forms no particular part of the instant invention, it suffices to understand that a billet is machined, drilled or otherwise operated upon for purposes of providing a suitable body for the switch 10.

Within one end of the body 12 there is formed a concentric recess 13 having a transverse planar face, not designated. Within the face there is disposed an annular array of photo-sensitive devices 14, each being connected in circuit series with a pair of extended electrical terminals 16 through electrical leads 18. As a practical matter, the photo-sensitive devices 14 are photoresistors or similar photo-conductive elements which are rendered conductive in the presence of impinging radiation. Since photo-conductive devices of the employed type are notoriously old, a detailed description of the devices 14, as employed, is, in the interest of brevity, omitted. However, it is to be understood that each of the photo-sensitive devices, as employed, includes a sharply delineated photo-sensitive area of predetermined dimensions. In practice, the devices 14 individually are seated within bores, not designated, radially spaced at equi-distances from the axis of symmetry of the mounting body 12, as well as being spaced with a common center-to-center spacing interval.

An axial bore 20 is extended through the mounting body 12, along its axis of symmetry, and communicates with the cylindrical recess 13. Through the bore 20 there is extended, and operatively supported, an elongated drive shaft 22. The shaft 22 operatively supports an interrupter 23. The interrupter 23 includes one of a plurality of interchangeable masking disks 24 and rotatably is seated within the recess 13. The masking disk 24 is rotated by the shaft 22 as the shaft is driven in rotation through any operable means. The shaft 22 is secured within the bore 20 through clips 26 seated in circumscribing grooves, not designated. While the disk 24 can be fixed to the shaft 22 in any suitable manner, it is preferred that the disk be mounted employing a plurality of mated splines or flats, also not designated, which couple the shaft to the associated disk and inhibit slippage of the disk, relative thereto as a rate of rotation is imposed on the shaft.

The recess 13 is defined by a cylindrical wall having a surface 30. This surface acts as a bearing surface for the disk 24 and supportingly receives the disk's peripheral surface 32 in a face-to-face contiguous engagement. The terminal end portion of the shaft 22, opposite the disk 24, is provided with a manual knob 36 seated thereon and coupled thereto in any suitable manner. It is to be understood, however, where preferred the shaft 22 can include a sheave or a sprocket so supported as to accommodate a positive driving of the shaft through a belt or chain coupling, not shown. In any event, the disk 24 is, in operation, driven in rotation simply by imposing on the shaft 22 a rate of rotation.

The masking disks 24 are fabricated from a suitable material. Each disk, depending upon its intended sequence of operation, is of an opaque nature having transparent portions formed therein, FIGS. 4 and 5, or, conversely, of a transparent nature having opaque portions formed therein, FIGS. 6 and 7. It should be apparent that the transparency and opacity can be established in various manners, including a selective painting of transparent materials or drilling of opaque materials. The specific arrangement of opaque and transparent portions is, in practice, dictated by the intended sequence of switching functions to be imposed on the switch 10 through a manipulative rotation of a shaft 22 and the number of circuits which concurrently are rendered conductive.

Disposed in coaxial alignment with the annular array of photo-sensitive devices, there is a suitable source of radiation, generally designated 40. In practice, the source of radiation includes a pair of series connected miniature electric lamps 42, coupled to a source of electrical energy through a lead 43, seated in suitable electrical receptacles 44. Preferably, the lamps 42 are connected to a source of DC potential, not shown, and have a combined output matched with the photo-sensitive devices 14.

The receptacles 44 are secured to a bracket 45 mounted in a substantially closed housing 46, preferably to an end plate 47 provided for the said housing. The housing also is provided with an annular flange 48 of the cylindrical configuration adapted to telescopingly receive therein the external surface of the mounting body 12 in a manner such that the housing 46 is arranged in a coaxial relationship with the mounting body 12, adjacent to the array of photo-sensitive devices 14. As a practical matter, the flange 48 includes a continuous internal surface 50 disposed in operative engagement with the external surface of the body 12 and has seated therein a plurality of screw-threaded pins 52 which are received in threaded engagement within screw-threaded openings 54 formed in the body 12 for purposes of coupling the housing 46 thereto. It is to be understood, of course, that the particular manner in which the housing 46 is coupled with the mounting body 12 can be varied as desired.

With the lamps 42 disposed adjacent the photo-sensitive devices 14, it is readily apparent that an energization of the lamps serves to impose a conductive state on all photo-sensitive devices 14 subjected to radiation propagated by the lamps. Hence, an electrical circuit is completed between the terminals 16, through each photo-sensitive device 14 which is subjected to propagated radiation so that a path for electrical current is established therethrough for thus effecting a circuit switching function. It should be appreciated that if desired, the current flowing through the leads 18 may be utilized as a signal current which is employed in driving a solenoid-operated switch located at a remote location.

As illustrated in FIG. 1, the housing 46 also includes a transverse closure plate 56. This plate is of circular configuration and fixedly is seated within the housing 46 through welding or through the use of any other suitable techniques. The plate 56 includes an annular array of openings 58, each being adapted to be brought into coaxial alignment with a photo-sensitive device 14 so that light can be propagated through the plate 56 to impinge on the masking disk 24 at points aligned with the photo-sensitive devices 14 whereby changes in the state of their conductivity can be achieved.

Referring particularly to FIGS. 4, 5, 6 and 7, the masking disks 24 are depicted having various combinations of opaque and transparent portions. The purpose of the combination of transparent and opaque portions is to mask selected photo-sensitive devices 14 from the radiation propagated by the lamp 42 so that by rotating the disk 24, in stepped rotation, radiation is caused to impinge only on selected photo-sensitive devices for thereby achieving operative control over selected circuits. Consequently, by employing specific patterns of opaque and transparent portions, circuit making-and-breaking sequences can readily be established in a predetermined manner.

As shown in FIGS. 4 and 5, the disks 24 are substantially opaque with minimum transparency. Therefore, only a limited number of devices 14 can be subjected to radiation at any given instant. Conversely, as shown in FIGS. 6 and 7, the disks substantially are transparent, with minimum opaqueness. Hence, only a minimum number of devices 14 can at any given instant be masked for causing the circuit through the masked devices 14 to be broken. It is to be understood that the masking disks 24 of the interrupter 23 readily are removable from the shaft 22. Therefore, the specific pattern of opaque and transparent portions employed for any given purpose can selectively be determined so as to impose a switching operation having a predetermined sequence.

As shown in FIGS. 4 and 5, the masking disks 24 of the interrupter 23 are provided with an opaque portion 60. This portion substantially is coextensive with the disk, excepting the transparent portion 62, FIG. 4, and the transparent portion 64, FIG. 5. As shown in FIGS. 6 and 7, a reverse arrangement of transparent and opaque portions exists in that the disk 24 includes a transparent portion 66 which substantially is coextensive therewith, excepting the opaque portions68 and 20. Therefore, it should readily be apparent that any switching sequence achieved at any given instant, through a stepped rotation of the interrupter 23, is dictated by the particular pattern of transparent and opaque portions provided for the particular disk 24 then being employed. In practice, a spring-loaded ball 72, FIG. 2, is seated in a bore 73, communicating with the surface 30. This ball is adapted to seatingly engage a detent 74 formed in the periphery 12 of the associated masking disk 24 for retaining the interrupter 23 in the disposition to which it has been advanced through a rotation of the shaft 22.

The various masking disks of the interrupter 23 are adapted to be interchanged for purposes of imposing a desired switching function on the switch 10. For example, where the opaque portion 60 substantially is coextensive with the disk 24, as illustrated in FIG. 4, only a single photo-sensitive device 14 will be exposed to light propagated from the lamps 42 through the transparent portion 62. Therefore, only one circuit will be at any instant rendered conductive. Conversely, where the trans-parent portion 66 substantially is coextensive with the disk 24, as illustrated in FIG. 6, all of the photo-sensitive devices 14, except the one which is masked by the opaque portion 68, will be subjected to light propagated from the lamps 42 and therefore be rendered conductive. Consequently, the pattern of the opacity of the masking disk 24 of the interrupter 23 serves to dictate the number of photo-sensitive devices which will be energized at any given instant.

Additionally, the established switching sequence which may be achieved through a rotation of the interrupter 23 is dictated by the size and configuration of the transparent portion of the disk 24 being employed. For example, as shown in FIG. 4, the transparent portion 62 is so dimensioned as to permit light to be propagated to impinge on a single photo-sensitive device 14, while the transparent portion 64, FIG. 5, sufficiently is large for accommodating a simultaneous propagation of light to two of the photo-sensitive devices 14. In a similar manner, the opaque portion 68, FIG. 5, sufficiently is large for masking a single photo-sensitive device, while the opaque portion 70 sufficiently is large for simultaneously masking a pair of adjacent photo-sensitive devices, FIG. 7.

It is important to understand that as many devices 14 as is desired are distributed in the annular array. Hence, the devices 14 are arranged at positions which, for the sake of convenience, are designated S1, S2 and . . . . Sn, FIG. 2.

Assuming that a mask 24 having an opaque portion 60, FIG. 4, is employed, a BREAK-BEFORE-MAKE function is imposed on the switch 10, due to the fact that the transparent portion 62 will in advancing in a clockwise direction, FIG. 2, uncover the photo-sensitive device 14 located at position S2 only after the photo-sensitive device 14 located at S1 is masked by the opaque portion 60. Consequently, the circuit established through the photo-sensitive device 14 located at position S1 will be broken before a circuit is completed through the photo-sensitive device 14 located at position S2. Similarly, when employing a masking disk 24 having a transparent portion 64, sufficiently large enough for simultaneously unmasking the photo-sensitive devices located at positions S1 and S2, a MAKE-BEFORE-BREAK operation is imposed on the device 10, since the circuit through the photo-sensitive device 14 located at the position S2 will be made before a circuit established through the photo-sensitive device 14 located at position S1 is broken.

When employing a masking disk 24 having its transparent portions substantially coextensive therewith, as illustrated in FIG. 6, a MAKE-BEFORE-BREAK function is achieved by displacing the opaque portion 68 from a masking disposition relative to the photo-sensitive device 14 located at position S1, to a masking position relative to the photo-sensitive device 14 located at position S2, thus permitting the device 14 located at position S1 to be unmasked before the device 14 located at position S2 is masked. Hence, before the opaque portion 68 has moved from its masking disposition at position S1, to its masking disposition at position S2, the photo-sensitive device located at position S1 is rendered conductive. By employing a masking disk 24 having an opaque portion 70, sufficiently large enough to mask two adjacent devices 14, a BREAK-BEFORE-MAKE function is imposed on the switch 10, since the photo-sensitive device 14 located at position S2 will be masked before the photo-sensitive device 14 will be unmasked at position S1.

OPERATION

It is believed that in view of the foregoing description, the operation of the device will be readily understood and it will be briefly reviewed at this point. With the switch 10 assembled in a manner hereinbefore described, and connected with a suitable source of energy for illuminating the lamps 42, it is adapted to be coupled through terminals 16 to any given plurality of circuits. The sequence of operation of the plurality of circuits coupled with the switch 10 is determined by the configuration of the opaque and transparent portions of the masking disk 24 of the interrupter 23.

Assuming that only one circuit is to be maintained in an energized state at any given instant, a disk such as illustrated in FIGS.4 and 5 is employed. Where it is desirable to achieve a BREAK-BEFORE-MAKE function for adjacent circuits, a masking disk 24 having a transparent portion 62 and an opaque portion 60 is chosen for use in the interrupter 23. By manually manipulating the knob 36 for advancing the transparent portion 62 between adjacent positions S1 and S2, the transparent portion 62 serves to unmask the photo-sensitive device 14 located at position S2, only after the opaque portion 60 has masked the photo-sensitive device 14 located at position S1. Consequently, the photo-sensitive device 14 located at position S2 is energized for "making" a circuit subsequent to a "breaking" of the circuit through the device 14 located at the position S1.

Where it is found desirable to make a single second circuit before breaking a first single circuit, and maintain only one "made" circuit, a masking disk 24 having an opaque portion 60 and a transparent portion 64, illustrated in FIG. 5, is employed. By manipulating the knob 36 for advancing the masking disk 24 through a distance sufficient to unmask the photo-sensitive device 14 located at position S2, before the photo-sensitive device 14 located at position S1 is masked, a circuit is "made" through the photo-sensitive device 14, located at position S2, prior to a masking of the photo-sensitive device 14, located at position S1. Thus a MAKE-BEFORE-BREAK function is achieved.

Where it is found desirable to render all of the associated circuits, save one, conductive, an interrupter 23 having a masking disk including a transparent portion 66 and an opaque portion 68 or 70, FIGS. 6 and 7, is employed. Where the transparent portion 66 is utilized and a MAKE-BEFORE-BREAK function, a disk 24 having an opaque portion 68 is employed. As the interrupter 23 is advanced in a clockwise direction, through a manipulation of the knob 36, the photo-sensitive device located at S1 is unmasked, and hence rendered conductive, for "making" its associated circuit, prior to the masking of the photo-sensitive device located at position S2 for thus "breaking" the associated circuit. Consequently, a "making" of one circuit is achieved prior to the "breaking" of another.

Where it is desirable to "break" the second circuit before "making" a first circuit, while interrupting only a single circuit, a transparent portion 66 having the opaque portion 70, FIG. 7, is employed. By advancing the disk 24 sufficiently for permitting the opaque portion 70 to simultaneously mask two adjacent photo-sensitive devices 14 a simultaneous "breaking" of both circuits is achieved, prior to "making" of the circuit connected with the photo-sensitive device 14 located at position S1.

While the device 10 has been described in terms of uni-directional rotation, it likewise should be apparent that the direction of rotation can be reversed where found desirable. Further, the number of circuits which may be coupled with the device 10, clearly is a matter of convenience and may be varied as found practical. Of course, the number of circuits which are "switched" upon any given advance can be varied as circumstances dictate, simply by varying the configuration of the opaque pattern.

In view of the foregoing, it is to be understood that the present invention provides a simplified, highly effective mechanically operable solid state switch which finds particular utility in an environment wherein contact bouncing and arcing are to be avoided while numerous switching functions are achieved in predetermined sequences.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. A manually operable, solid-state switch comprising:

A. an elongated body of synthetic resin including a recess of a cylindrical configuration formed within one end thereof;

B. a plurality of photo-conductive elements seated in said body adjacent to said recess circumferentially spaced at equidistances in a substantially uniform annular array circumscribing a concentrically related longitudinal axis of symmetry for said body;

C. a source of light common to said plurality of devices disposed adjacent to said recess for simultaneously propagating a beam of light toward each device of said plurality of photo-conductive elements;

D. a masking disk supported between said source of light and said array including an opaque portion defining a mask of preselected dimensions;

E. a rotatable shaft extended concentrically through said body supporting said disk at one end thereof in a manner such that the opaque portion is rotatably displaced simultaneously with said shaft into a selected masking relationship relative to selected photo-conductive elements, the number thereof being determined by the dimensions of said mask; and F. a manually rotatable knob affixed to said shaft at the end thereof opposite said disk through which rotation is manually imparted to said shaft.

2. The switch of claim 1 wherein each of said photo-sensitive devices comprises a photo-conductive element operatively coupled within an electrical circuit.

3. The switch of claim 2 wherein the opaque portion of the disk is so dimensioned as to mask a single photo-conductive element prior to unmasking an adjacent photo-conductive element as said disk operatively is rotated.

4. The switch of claim 2 wherein the opaque portion of said disk is so dimensioned as to unmask one of said photo-conductive elements before masking an adjacent photo-conductive element as said disk is rotated.

5. The switch of claim 2 wherein said opaque portion is so dimensioned as to simultaneously mask all but a single photo-conductive element.

6. The switch of claim 2 wherein said opaque portion is so dimensioned as to simultaneously mask all but two adjacent photo-conductive elements.

7. The switch of claim 2 wherein said opaque portion is so dimensioned as to simultaneously mask a single photo-conductive element.

8. The switch of claim 2 wherein said opaque portion is so dimensioned as to simultaneously mask two adjacent photo-conductive elements.

* * * * *